US012656067B1

(12) United States Patent
Mathur

(10) Patent No.: US 12,656,067 B1
(45) Date of Patent: Jun. 16, 2026

(54) PASSIVE MANAGEMENT OF THERMAL STRATIFICATION WITHIN LONG-DURATION LIQUID-BASED THERMAL ENERGY STORAGE RESERVOIRS

(71) Applicant: Terrafore Technologies LLC, Shoreview, MN (US)

(72) Inventor: Anoop Mathur, Shoreview, MN (US)

(73) Assignee: Terrafore Technologies LLC, Shoreview, MN (US)

( * ) Notice: Subject to any disclaimer, the term of this patent is extended or adjusted under 35 U.S.C. 154(b) by 0 days.

(21) Appl. No.: 19/214,972

(22) Filed: May 21, 2025

(51) Int. Cl.
*F28D 20/00* (2006.01)
*F28D 20/02* (2006.01)
*F24S 60/30* (2018.01)

(52) U.S. Cl.
CPC ..... *F28D 20/0039* (2013.01); *F28D 20/0043* (2013.01); *F28D 20/023* (2013.01); *F24S 60/30* (2018.05)

(58) Field of Classification Search
CPC ..... F28D 20/0039; F28D 20/02; F28D 20/021
See application file for complete search history.

(56) References Cited

U.S. PATENT DOCUMENTS

| | | | | |
|---|---|---|---|---|
| 4,505,953 A | * | 3/1985 | Chen ..................... | C09K 5/063 |
| | | | | 427/221 |
| 8,554,377 B2 | | 10/2013 | Mathur et al. | |
| 9,650,556 B2 | | 5/2017 | Oxley et al. | |
| 10,107,564 B2 | | 10/2018 | Mathur et al. | |

(Continued)

FOREIGN PATENT DOCUMENTS

| | | | | | |
|---|---|---|---|---|---|
| EP | 2204618 A2 | * | 7/2010 | ......... | F28D 20/0039 |
| JP | 2004060960 A | * | 2/2004 | ............. | F28D 20/02 |
| JP | 2009299920 A | * | 12/2009 | ........... | F28D 20/023 |

OTHER PUBLICATIONS

Westaway, Repurposing of disused shale gas wells for subsurface heat storage, 2016 (Year: 2016).*

*Primary Examiner* — Eric S Ruppert
(74) *Attorney, Agent, or Firm* — Merchant & Gould P.C.

(57) ABSTRACT

A thermal energy storage system configured to maintain thermal stratification and enhance energy storage efficiency over repeated charge and discharge cycles. The system includes a containment structure, such as a repurposed hydrocarbon wellbore, configured to retain a thermal energy storage fluid. A plurality of phase change material (PCM) elements are encapsulated within microcapsules or macro-encapsulated tubes and positioned within top and/or bottom regions of the containment structure. The PCM elements absorb and release latent heat at predetermined phase transition temperatures to stabilize and narrow the thermocline formed within the thermal fluid column. A reversible high-temperature heat pump (RHTHP) may be integrated to facilitate thermal energy input during charging and energy conversion during discharging. Internal fluid distribution mechanisms, including vertically distributed flow distributors and selectively actuated valves, are configured to control the location and velocity of fluid flow to further preserve thermocline integrity. The system is suitable for long-duration energy storage (LDES) applications, enabling dispatchable, zero-emission energy delivery using repurposed infrastructure.

20 Claims, 14 Drawing Sheets

(56)  References Cited

U.S. PATENT DOCUMENTS

| | | | |
|---|---|---|---|
| 11,473,852 B2 | 10/2022 | Mathur | |
| 2010/0230075 A1 | 9/2010 | Mathur et al. | |
| 2011/0081134 A1* | 4/2011 | Salyer | F24H 7/0408 |
| | | | 392/308 |
| 2013/0264513 A1* | 10/2013 | Yu | C09K 5/02 |
| | | | 252/68 |
| 2015/0292810 A1* | 10/2015 | Pilebro | F28D 20/0052 |
| | | | 165/10 |

* cited by examiner

THERMOCLINE PERFORMANCE (NO ACTIVE CONTROL) FOR 10 FULL (EXIT TEMP WITHIN 5% OF DESIRED) CHARGE AND DISCHARGE CYCLES

CYCLE 1 FULLY DISCHARGED

CYCLE 10

CYCLE 10

CYCLE 1 FULLY CHARGED

TANK HEIGHT

NORMALIZED TEMPERATURE
(0=DESIGNED COLD TEMPERATURE, 1=DESIGNED HOT TEMPERATURE)

Cycle 1

Charged    Discharged

Cycle 2

Charged    Discharged

Cycle N

Charged    Discharged

Thermocline Grows discharge prior to PCM module     Thermocline enters PCM module and begins to flatten as discharge continues

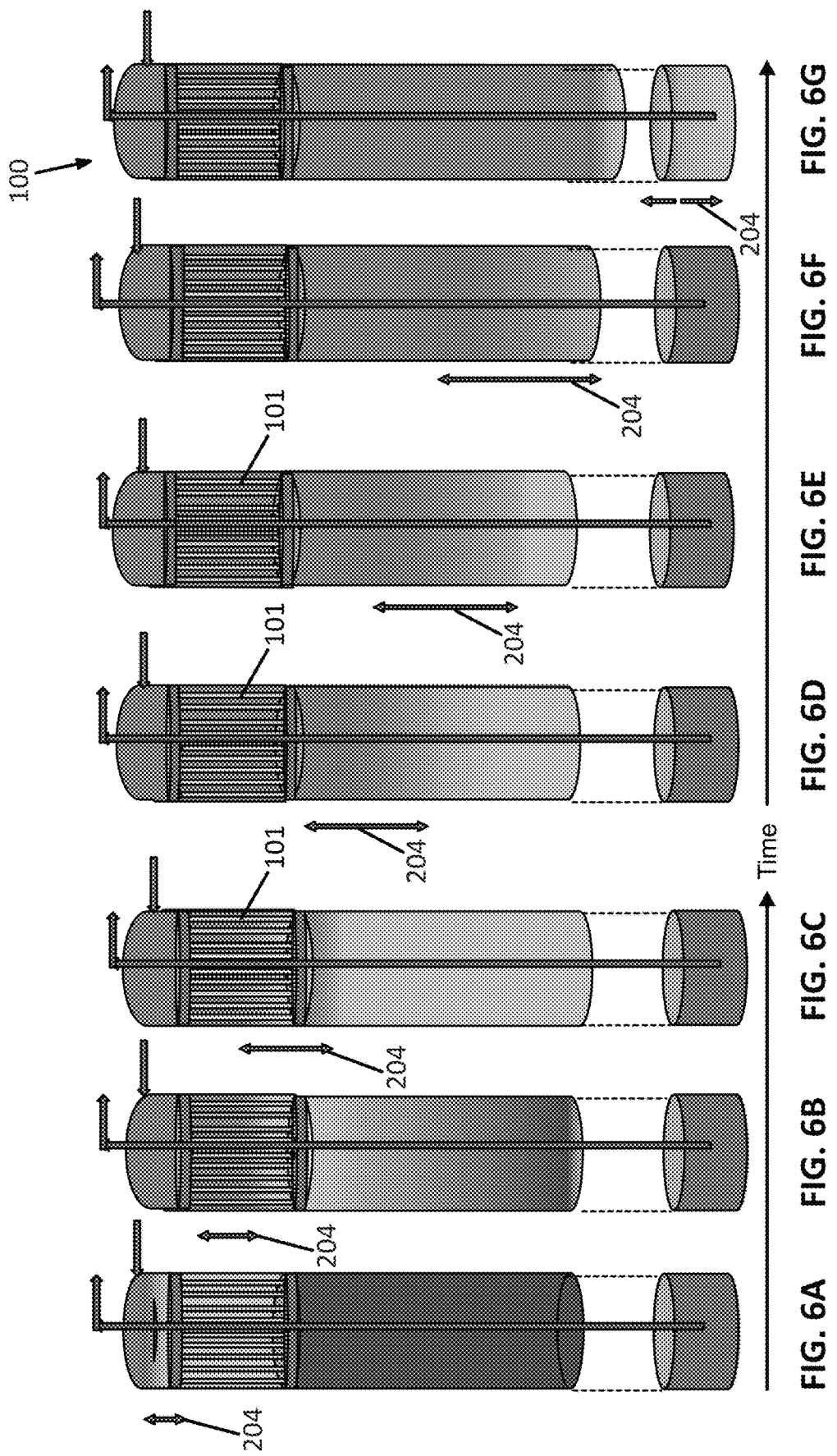

Cycle 1

Cycle 2

Cycle N

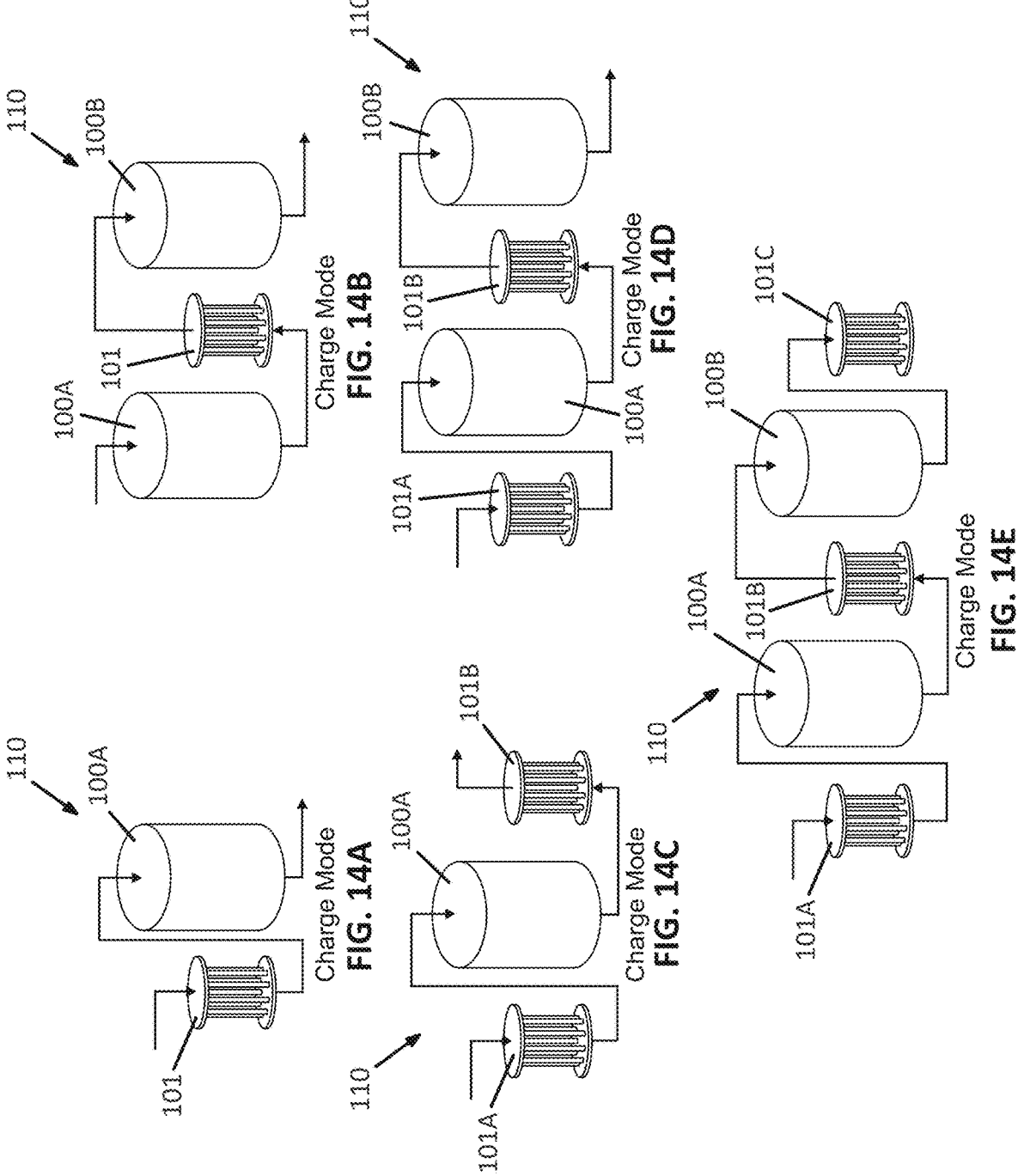

PASSIVE MANAGEMENT OF THERMAL STRATIFICATION WITHIN LONG-DURATION LIQUID-BASED THERMAL ENERGY STORAGE RESERVOIRS

TECHNICAL FIELD

The present disclosure relates generally to thermal energy storage systems, and more specifically to systems and methods for preserving thermal stratification within liquid-based thermal reservoirs, including those implemented within repurposed hydrocarbon wellbores for long-duration energy storage applications.

BACKGROUND

Thermal energy storage systems deployed within repurposed wellbores present a promising opportunity to address grid imbalances caused by the increasing penetration of variable renewable energy sources such as solar and wind. Many hydrocarbon wells across the United States remain idle or abandoned following decades of oil and gas extraction activity, and these wells can be structurally adapted to function as vertically oriented thermal reservoirs. However, maintaining efficient and reliable thermal stratification within such repurposed wellbores introduces unique technical challenges. Unlike purpose-built tanks, wellbores are characterized by narrow diameters, deep vertical profiles, and varying geological interfaces, all of which complicate fluid handling and thermocline management. Preserving the integrity of the thermocline—i.e., the interface between hot and cold thermal energy storage fluid—is essential for maintaining system efficiency across multiple charge and discharge cycles. Without effective thermocline stabilization, thermal mixing and degradation may reduce the usable storage capacity, impair heat transfer performance, and diminish the economic and operational viability of wellbore-based thermal energy storage solutions.

SUMMARY

The present disclosure relates to systems and methods for thermally stratified energy storage within repurposed containment structures, including wellbores, and more particularly to techniques for preserving thermocline integrity over extended operating cycles to improve storage efficiency and maintain available storage capacity in long-duration energy storage (LDES) applications. In various embodiments, the invention addresses the technical challenges associated with maintaining a stable thermocline in deep, narrow geometries typical of hydrocarbon wells, which are structurally well-suited for conversion into vertically oriented thermal reservoirs but require specialized configurations to limit thermal mixing, conduction losses, and stratification decay.

Accordingly, one aspect of the invention provides a thermal energy storage system comprising a containment structure, such as a tank or repurposed wellbore, containing a thermal energy storage fluid and a phase change material (PCM) module positioned either both or within at least one of a top region and a bottom region of the containment structure. The PCM module is encapsulated PCM in microcapsules or macro-encapsulated in thermally conductive tubes or absorbed in metal foams and is configured to absorb or release latent heat at predefined phase transition temperatures. In one embodiment, PCM module located at the top region of the tank has a melting point just below the maximum operating temperature, while PCM module at the bottom region has a melting point just above the minimum operating temperature. The PCM passively narrows and stabilizes the thermocline when the thermocline region passes over the PCM module. This mitigates convective thermal mixing and buffering heat conduction, thereby enhancing cycle-to-cycle thermal efficiency or storage capacity.

In another aspect, the system is operatively coupled to a reversible high-temperature heat pump (RHTHP), which may function as a heat source during charging and as a heat engine during discharging. During a charging cycle, thermal energy—derived from solar thermal collectors, industrial waste heat, photovoltaic and/or grid-supplied power via the RHTHP—is transferred to the thermal fluid and delivered to the thermal reservoir. During discharge, the thermal energy from the top region of the tank or wellbore is delivered to RHTHP which converts it to electricity in a dispatchable manner. This two-way thermal coupling supports efficient round-trip energy conversion, allowing the system to respond dynamically to grid demand fluctuations and to operate as a firm renewable energy asset.

In certain embodiments, the invention is particularly well-suited for deployment within decommissioned or idle oil and gas wells. The naturally occurring height-to-diameter aspect ratio of a wellbore promotes gravitational stratification and thermal layering. When adapted with closed-loop heat exchangers and PCM-enhanced thermocline stabilization, such wells can be repurposed into LDES systems that reduce environmental hazards—such as methane emissions—while supporting the grid with flexible, zero-emission electricity generation.

The invention further encompasses a range of customizable configurations, including single-tank systems, series-connected multi-tank architectures, and dual-media systems comprising solid-liquid combinations such as packed rock beds immersed in thermal fluid. These systems may be tuned for different thermal fluids, storage temperatures, and operational lifetimes, providing broad applicability across renewable integration, industrial decarbonization, and utility-scale energy storage deployments.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of this description, illustrate various aspects of the present disclosure. A brief description of the drawings is as follows:

FIGS. 6A-6G are schematic illustrations of the thermal energy storage system during a charge cycle, illustrating thermocline behavior with and without a passive thermocline management mechanism positioned at the bottom region.

FIGS. 14A-14E are schematic diagrams of distributed energy resource configurations showing various positions of passive thermocline management mechanisms relative to one or more thermal energy storage systems.

DETAILED DESCRIPTION

Figure 1:
FIG. 1 is a schematic diagram of a distributed energy resource coupled to one or more thermal energy storage systems, in accordance with an embodiment of the invention.

Over a period exceeding a century, extensive oil and gas extraction activities within the United States have resulted in the installation of millions of wells, a significant portion of which are no longer in active service. Many such wells remain unplugged, improperly sealed, or idle, thereby presenting potential environmental and public health concerns. A subset of these wells may also serve as unregulated emission points for methane, a greenhouse gas with a high global warming potential. However, wells that are structurally intact can be repurposed, and thus offer a potential opportunity for the deployment of alternative infrastructure, including subsurface energy storage systems.

Concurrently, the electrical power grid has experienced a growing integration of distributed energy resources (DERs), including, for example, solar and wind-based power generation systems. The intermittent and non-dispatchable nature of these DERs introduces variability in electricity production, with generation levels generally peaking during daylight hours. This temporal mismatch between generation and consumption results in an increasingly complex supply-demand dynamic within the grid. In particular, net electricity demand often declines significantly during midday periods when DER generation is high, followed by a rapid increase in demand during the late afternoon and evening hours as DER output diminishes, and consumer energy use rises. This effect, often referred to as the "duck curve," illustrates a pronounced trough in midday demand and an exaggerated ramp in demand during later hours.

In various operating conditions, the rate of increase in electricity demand during the late afternoon and evening may exceed the ramping capabilities of conventional thermal power plants, which are typically designed for continuous and stable output. When such ramp rates cannot be accommodated, grid operators may be required to initiate high-cost peaking generation units or purchase electricity from external suppliers at premium rates. Additionally, curtailing DER output to prevent grid oversupply during periods of excess generation can result in the underutilization of renewable energy resources. These limitations present a compelling need for long-duration energy storage (LDES) systems capable of absorbing excess generation during low-demand periods and dispatching stored energy during periods of higher demand.

Repurposing idle or previously abandoned hydrocarbon wells as reservoirs for thermal energy storage can reduce greenhouse gas emissions while concurrently supporting the integration of renewable energy resources. In one embodiment, such repurposing may comprise the integration of thermal energy storage systems within existing well infrastructure, thereby transforming an otherwise inactive asset into a functional energy storage component. In such configurations, surplus renewable energy generated during off-peak production intervals can be stored and subsequently released during periods of elevated energy demand. This repurposing approach may further align with regulatory compliance efforts and may reduce the overall cost and complexity associated with conventional well remediation and abandonment procedures.

Figure 2:
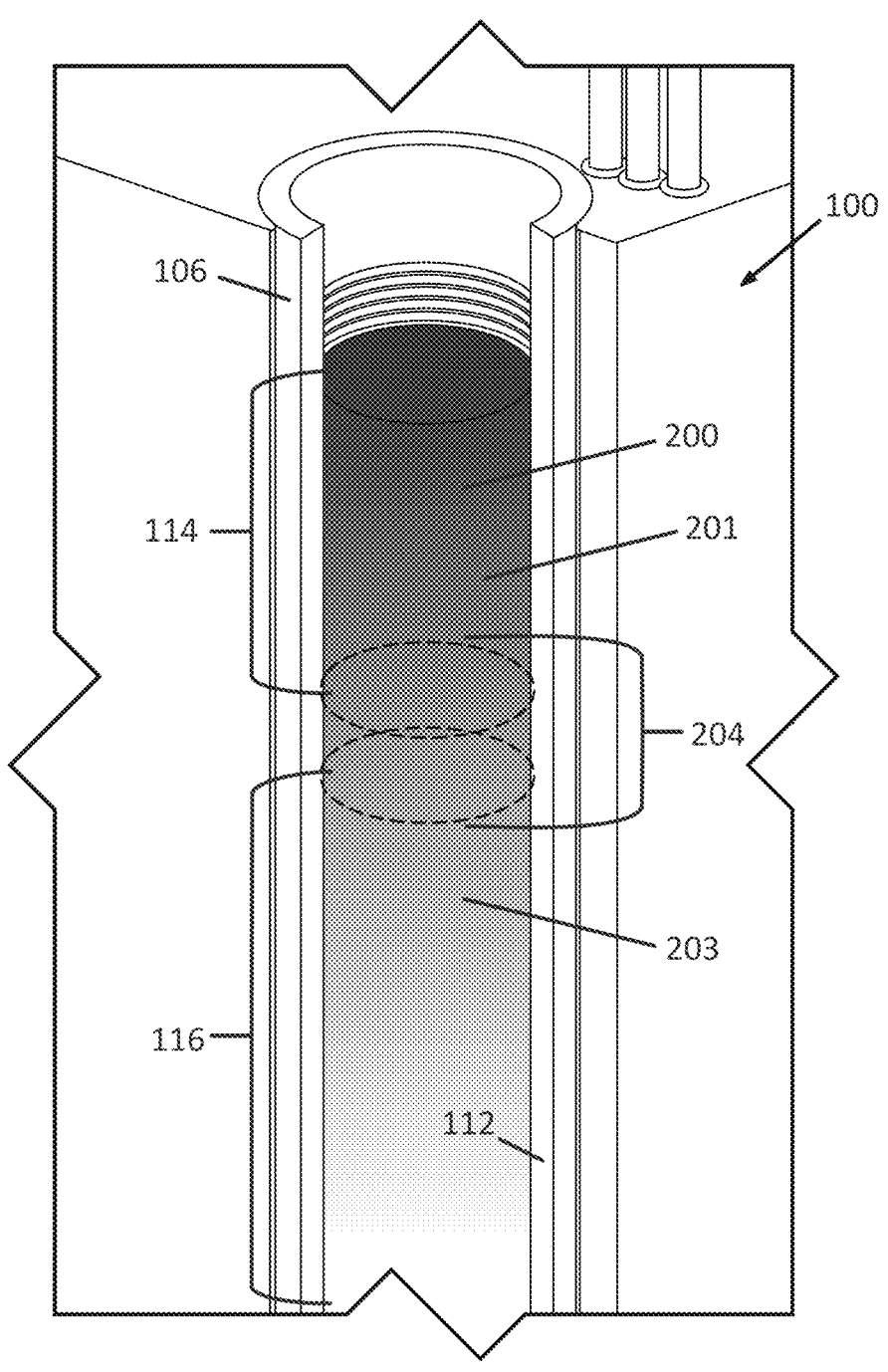
FIG. 2 is a partial, cross-sectional view of a thermal energy storage system, showing stratification within a repurposed wellbore used as a containment structure.

Referring now to FIG. 1, a schematic representation of a distributed energy resource 110 coupled to a plurality of thermal energy storage systems 100 is illustrated, in accordance with an embodiment of the invention. In one embodiment, the distributed energy resource 110 includes a field-deployed array of solar collectors 102 configured to convert incident solar radiation into electrical energy or a combination of thermal and electrical energy. The heat and electrical energy generated by the solar collectors 102 may be directed to a reversible high temperature heat pump (RHTHP) 108 and a heat exchanger 104 thermally coupled to a volume of thermal energy storage fluid 200 (as depicted in FIG. 2). The heat exchanger 104 is configured to elevate the temperature of the thermal energy storage fluid 200 through the application of thermal energy derived from the thermal and electrical output of the distributed energy resource 110. In alternate embodiments, a heat source heat exchanger 104 and heat pump module 108 may be configured to receive thermal energy from other renewable or low-carbon energy sources, including, but not limited to, solar thermal collectors, industrial waste heat recovery systems, or grid-supplied electricity.

With additional reference to FIG. 2, a partial, cross-sectional view of the thermal energy storage system 100 is illustrated, in accordance with an embodiment of the invention. The thermal energy storage fluid 200 is retained within a containment structure 112 comprising at least a portion of a repurposed wellbore 106, wherein the wellbore has been scaled in accordance with regulatory requirements and adapted to serve as a vertically oriented thermal reservoir. The repurposed wellbore 106 defines an elongated internal cavity extending downward from the surface and comprises a hot, top region 114 and a cold, bottom region 116, each defined with respect to the vertical extent of the wellbore. The top region 114 corresponds to an upper portion of the thermal fluid column, while the bottom region 116 corresponds to a lower portion proximate to the sealed terminal end of the wellbore. During a charging cycle, cooler thermal energy storage fluid 203 is extracted from the bottom region 116 through a long vertical tube (not shown), routed through the heat source heat exchanger 104, and heated using thermal energy provided by the distributed energy resource 110 and the heat pump module 108. The resulting heated fluid is reintroduced into the top region 114 of the repurposed wellbore 106, thereby forming a thermally stratified column comprising hotter, less dense fluid above cooler, denser fluid, and establishing a thermocline within the containment structure 112.

During a discharging cycle, heated thermal energy storage fluid 201 is extracted from the top region 114 of the repurposed wellbore 106 and directed to a discharge heat exchanger 104. In one embodiment, the discharge heat exchanger 104 provides thermal energy to heat pump module 108 configured to operate in a discharging mode, wherein thermal energy from the heated fluid is transferred to a power generation cycle, such as a steam turbine, thermodynamic engine, or thermoelectric generation system. The RHTHP may be operable to provide dispatchable electricity output by converting thermal energy from the extracted fluid into mechanical or electrical energy. After thermal energy has been extracted, the cooled fluid is returned to the bottom region 116 through the long vertical tube of the repurposed wellbore 106, thereby reestablishing the thermal gradient and supporting continued cyclic operation. In accordance with various embodiments, the thermal energy storage system 100 is configured for LDES applications and is capable of providing discharge durations of approximately ten hours or more, depending on system design and thermal input conditions.

Under idealized thermal conditions, the stratification of thermal energy storage fluid 200 within the repurposed wellbore 106 is substantially preserved, such that a distinct and stable interface is maintained between the hot fluid in the top region 114 and the cold fluid in the bottom region 116. However, in practical applications, a finite transition zone, hereinafter referred to as the thermocline zone, exists between the upper and lower fluid layers. The thermocline zone as it moves up in the well during the discharge and moves down during the charge thickens due to convective mixing and conduction. The stability and thickness of this thermocline zone relate directly to the thermal efficiency, energy retention capacity, and discharge performance of the thermal energy storage system 100 during long-duration storage cycles.

As shown, a volume of higher temperature thermal fluid 201 is disposed above a volume of lower temperature thermal fluid 203 within the interior of the repurposed wellbore 106. The stratification of these two thermal regions is maintained, at least in part, by a thermocline zone 204 extending between the upper and lower thermal regions. The thermocline zone 204 comprises a transition region in which the temperature of the thermal fluid changes progressively from that of the higher temperature thermal fluid 201 to that of the lower temperature thermal fluid 203. The vertical position of the thermocline zone 204 within the wellbore may vary depending on the operational state of the thermal energy storage system 100.

During a charging operation, thermal energy is added to the thermal energy storage system 100 by circulating fluid through the heat source heat exchanger 104 and returning the heated fluid to an upper region of the repurposed wellbore 106. As heated fluid accumulates, the thermocline zone 204 moves downward, indicating the expansion of the higher temperature thermal fluid 201. Conversely, during a discharging operation, heated fluid is extracted from the upper region of the repurposed wellbore 106 and routed through the discharge heat exchanger 104. As the extracted thermal fluid is replaced with cooler fluid, the thermocline zone 204 moves upward, reducing the vertical extent of the higher temperature thermal fluid 201. In a fully charged state, the thermocline zone 204 is at the upper region of the. In a fully discharged state, the thermocline zone 204 is at the bottom region of the well.

In a conventional, unmanaged system, in an initial or nominal state, the thermocline zone 204 may occupy a vertical span corresponding to approximately ten to fifteen percent of the total height of thermal fluid within the repurposed wellbore 106. Over repeated charge and discharge cycles, however, the thermocline zone 204 may experience degradation. For example, extraction and reinjection of fluid during thermal cycling may induce mixing between the higher temperature thermal fluid 201 and the lower temperature thermal fluid 203 at the interface region, thereby increasing the vertical thickness of the thermocline zone 204. This degradation in stratification may reduce the system's ability to maintain a sharp thermal boundary and diminish the overall efficiency of thermal storage.

The thermal energy storage performance of the thermal energy storage system 100 may be characterized in terms of a utilization factor, which may be defined as the ratio of the effective storage height (i.e., the total height of thermal fluid in the well minus the height of the thermocline zone 204) to the total fluid height. As the thermocline zone 204 expands due to mixing, conduction, or turbulence, the utilization factor decreases, reducing the amount of recoverable thermal energy. In some implementations, as few as ten charge and discharge cycles may result in a significant expansion of the thermocline zone 204, with a corresponding reduction in thermal storage capacity of up to approximately fifty percent. Additional sources of thermocline degradation may include axial thermal conduction, entry or exit flow disturbances, and elevated flow velocities within the wellbore.

Figure 3:
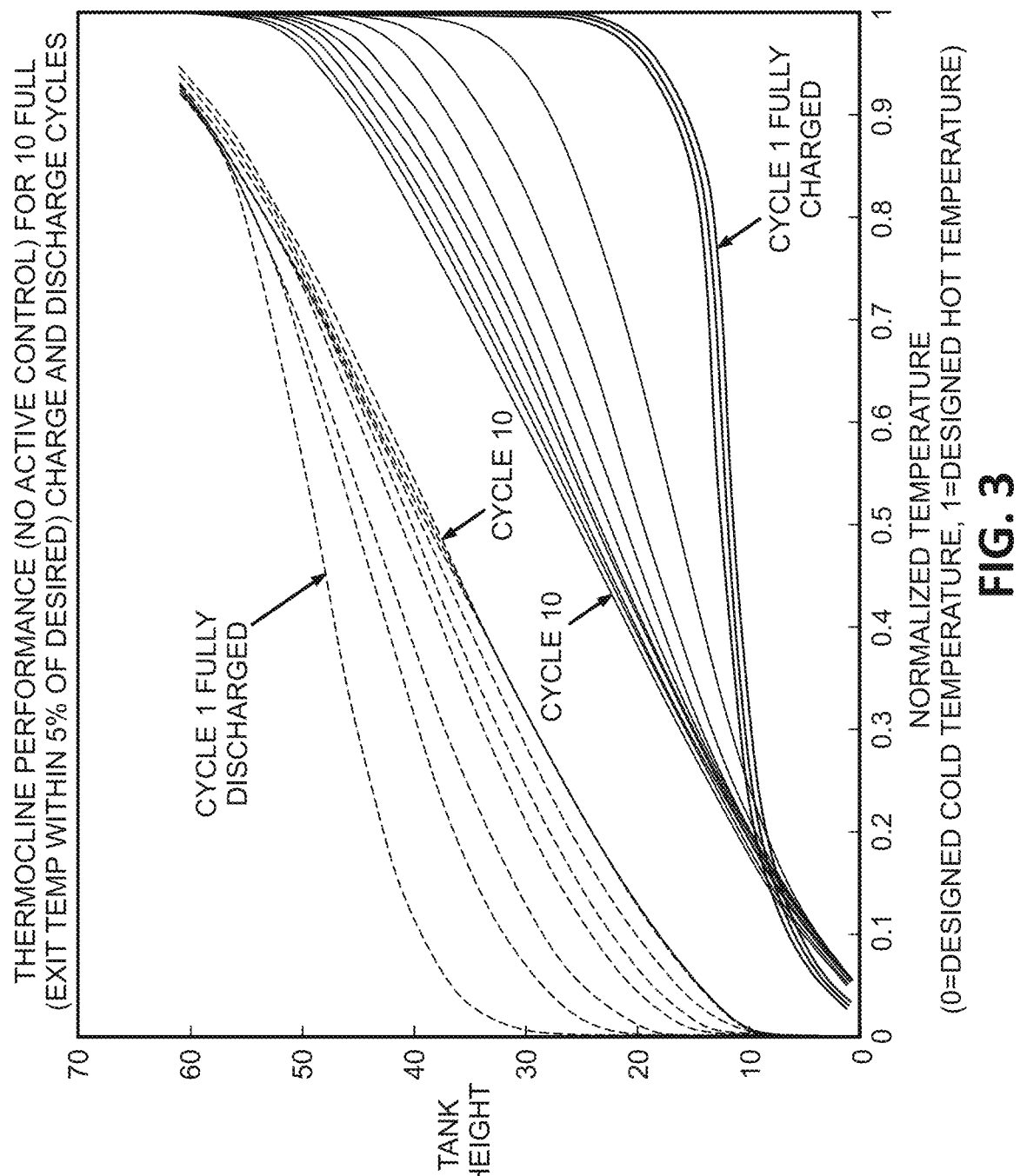
FIG. 3 is a graphical representation of normalized temperature profiles in an unmanaged thermal energy storage system over multiple charge/discharge cycles, illustrating thermocline degradation.

Referring now to FIG. 3, an exemplary graphical representation of a temperature profile within a thermal energy storage system 100 for a nominal thermocline storage (without the passive or active management) is illustrated, in accordance with an embodiment of the invention. FIG. 3 depicts the normalized temperature profile versus the height of the containment and shows the degradation of the stratification within a vertically oriented thermal reservoir—such as repurposed wellbore 106—over the course of several sequential charge and discharge cycles. The vertical axis represents the height of the thermal fluid column, and the horizontal axis represents a normalized temperature scale ranging from 0 to 1, where a normalized value of 0 corresponds to a designated cold temperature and a value of 1 corresponds to a designated hot temperature of the thermal energy storage fluid.

The uppermost set of curves in FIG. 3A, represent the thermal profile of the thermal energy storage system 100 in a fully discharged condition, wherein the thermal reservoir contains a majority volume of lower temperature thermal fluid 203. The lowermost set of curves correspond to a fully charged condition, wherein the thermal reservoir contains a majority volume of higher temperature thermal fluid 201. The area enclosed between the discharge and charge curves is indicative of the effective thermal energy storage capacity of the thermal energy storage system 100 and may be used to characterize the system's utilization factor over multiple operating cycles.

In the illustrated example, the thermal energy storage system 100 undergoes ten consecutive charge-discharge cycles, during which the system is operated under a thermal performance constraint that requires the extracted fluid temperature to remain within +5% of a predetermined target value. As shown, the enclosed area between the thermal profiles progressively decreases with each successive cycle, reflecting the degradation of the thermocline zone 204. By the tenth cycle, the thermocline zone 204 has widened significantly, resulting in a reduction in effective storage capacity of approximately 50% relative to the initial condition, demonstrating the cumulative impact of thermal cycling on stratification performance without active or passive management of the thermal stratification.

Figures 4A, 4B, 4C:
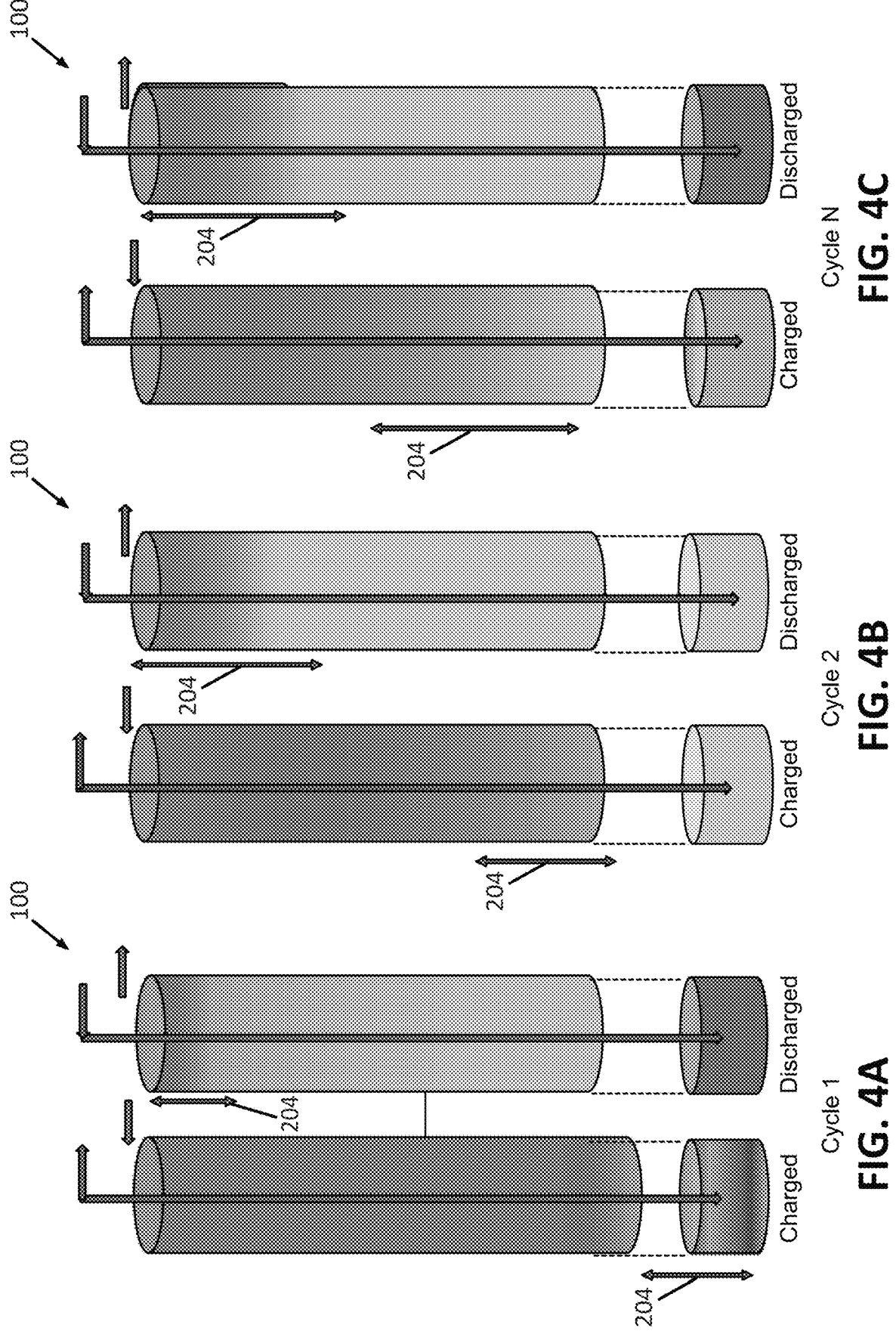
FIGS. 4A-4C are schematic illustrations of a thermal energy storage system showing progressive thermocline broadening over the first, second, and nth charge/discharge cycles in the absence of thermocline management.

Referring now to FIGS. 4A, 4B, and 4C, schematic illustrations of a thermal energy storage system 100 are shown, each depicting the condition of thermal stratification within a repurposed wellbore 106 across successive charge-discharge cycles. In each figure, a volume of higher temperature thermal fluid 201 is disposed above a volume of lower temperature thermal fluid 203, with a thermocline zone 204 extending therebetween. The thermocline zone 204 is defined as a transition region characterized by a continuous temperature gradient from the hot upper region to the cooler lower region.

In FIG. 4A, the thermal energy storage system 100 is illustrated following a first complete charge and discharge cycle. As shown, the thermocline zone 204 is relatively narrow, occupying a minimal portion of the vertical extent of the fluid column. This configuration corresponds to an initial or nominal operating condition, wherein thermal stratification is substantially preserved and the utilization factor remains near design values.

In FIG. 4B, the thermal energy storage system 100 is illustrated following a second charge-discharge cycle. The thermocline zone 204 has expanded relative to the condition depicted in FIG. 4A, indicating early-stage degradation of the thermal boundary. This widening may result from increased thermal diffusion, fluid entrainment, or turbulence induced by fluid exchange processes.

In FIG. 4C, the thermal energy storage system 100 is illustrated following an nth charge-discharge cycle. At this stage, the thermocline zone 204 has grown substantially, spanning a large portion of the fluid column within the repurposed wellbore 106. The distinction between the higher temperature thermal fluid 201 and the lower temperature thermal fluid 203 becomes less defined, resulting in diminished thermal stratification and reduced energy storage efficiency. These figures collectively illustrate the progressive deterioration of the thermocline over time in the absence of active or passive stabilization mechanisms, emphasizing the need for improved thermocline management strategies within long-duration thermal energy storage applications.

Figures 5A, 5B, 5C, 5D, 5E, 5F, 5G:
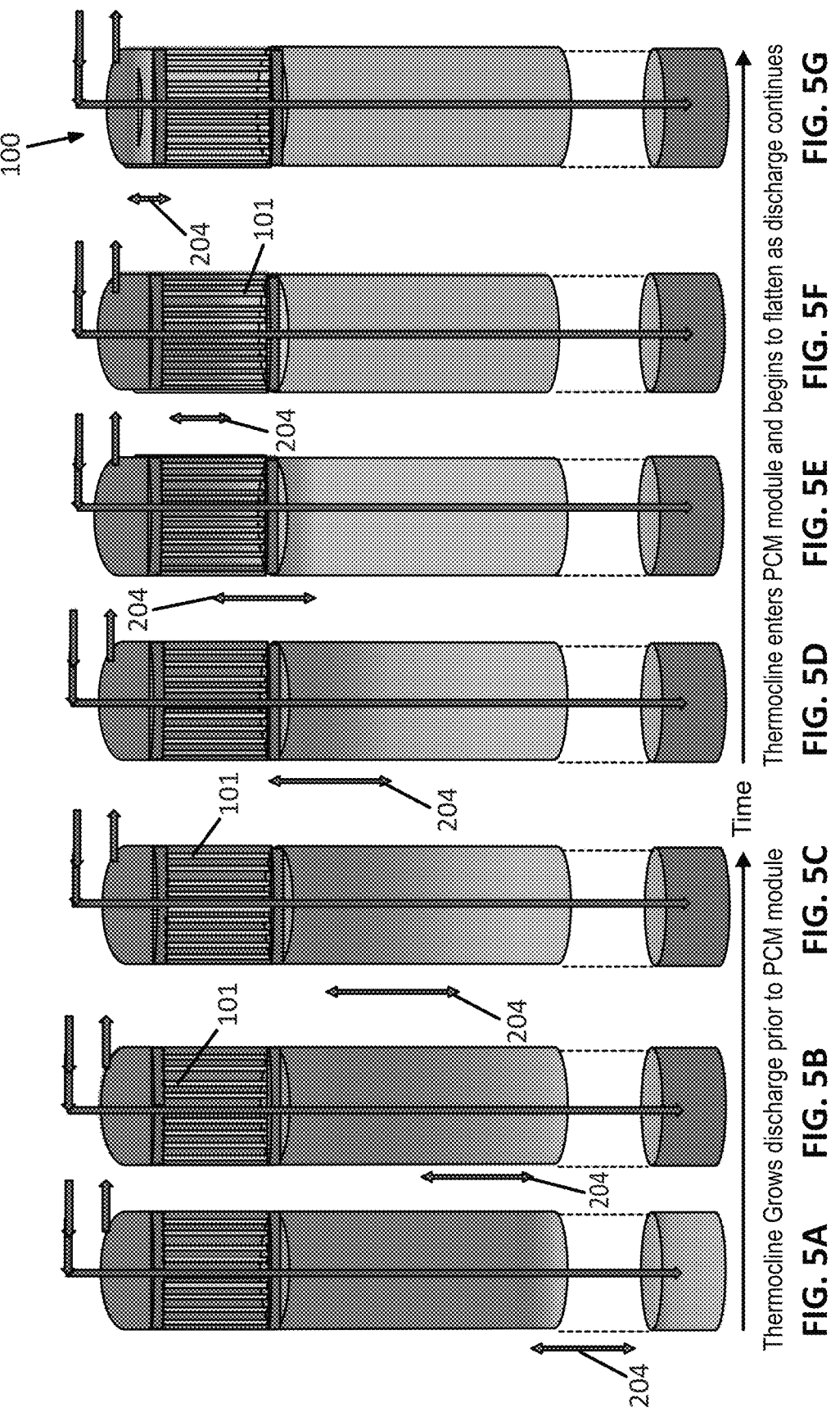
FIGS. 5A-5G are schematic illustrations of a thermal energy storage system incorporating a passive thermocline management mechanism during a discharge cycle, showing stabilization of the thermocline.

Referring now to FIGS. 5A through 5G, schematic representations of a thermal energy storage system 100 are illustrated at various stages of a discharge cycle, in accordance with an embodiment of the invention incorporating a passive thermocline management mechanism 101. The configuration of thermal energy storage system 100 shown in FIGS. 5A-5G differs from the unmanaged system depicted in FIGS. 4A-4C by the inclusion of passive thermocline management mechanism 101, which in this embodiment comprises a phase change material (PCM) module positioned within the vertical extent of the containment structure. As shown in FIG. 5A, discharge begins with a relatively sharp thermocline zone 204, which gradually increases in vertical thickness as thermal energy is extracted, similar to the behavior observed in FIGS. 4A-4C.

However, unlike the unmanaged system, the thermocline zone 204 in FIG. 5C begins to enter the region occupied by the passive thermocline management mechanism 101. As illustrated in FIGS. 5D through 5F, continued discharge results in interaction between the descending thermocline zone 204 and the PCM module, which is configured to absorb thermal energy at a substantially constant phase transition temperature. This phase change behavior facilitates the stabilization of the thermal gradient by buffering temperature variations and impeding further mixing between the higher temperature thermal fluid 201 and the lower temperature thermal fluid 203.

As a result, the thermocline zone 204 begins to narrow and flatten as it passes through the passive thermocline management mechanism 101, thereby counteracting the degradation effects typically observed during extended discharge operations. FIG. 5G illustrates the thermal energy storage system 100 near the end of the discharge cycle, wherein the thermocline zone 204 remains substantially narrower than in the comparable unmanaged configuration depicted in FIG. 4C. This observed reduction in thermocline thickness corresponds to an improvement in thermal stratification and energy storage utilization, demonstrating the effectiveness of passive thermocline management mechanism 101 in preserving the integrity of the thermal gradient during cycling.

Referring now to FIGS. 6A through 6G, schematic representations are provided to illustrate the evolution of the thermocline zone 204 within thermal energy storage system 100 during a representative charging and discharging sequence. As shown in FIGS. 6A through 6E, during the charging cycle, heated thermal energy storage fluid 201 is introduced into the top region 105 of the containment structure 112, displacing lower temperature thermal fluid 203 downward. As this process continues, the thermocline zone 204 correspondingly shifts downward through the vertical extent of the fluid column, and its vertical thickness gradually increases due to stratification degradation. In the configuration shown in FIG. 6E—representing the end of a discharge cycle—the thermocline zone 204 is at its widest extent, as no passive thermocline management mechanism is present in the lower portion of the system.

In alternate embodiments, a passive thermocline management mechanism 101 may be positioned within the bottom region 107 of containment structure 112. In such configurations, as the thermocline zone 204 descends into the bottom region during charging, or rises through it during discharging, the PCM module acts to stabilize and narrow the thermocline zone 204 by absorbing or releasing thermal energy at a predefined phase transition temperature. This behavior mitigates interlayer mixing and thermal diffusion, thereby improving thermocline sharpness and storage effectiveness.

In one embodiment, the end of the discharge cycle is defined as the point at which the temperature of the extracted fluid falls below a predetermined cutoff threshold—e.g., within approximately 5% of the differential between the designated hot and cold operating temperatures. In the embodiment shown in FIGS. 6A-6G, the absence of a passive PCM module in the bottom region permits continued thermocline broadening throughout the cycle. However, in configurations including such a module at the bottom, the thermocline zone 204 is passively constrained as it traverses the bottom region, thereby improving stratification stability and increasing the overall utilization factor of the thermal energy storage system 100.

Figures 7A, 7B, 7C:
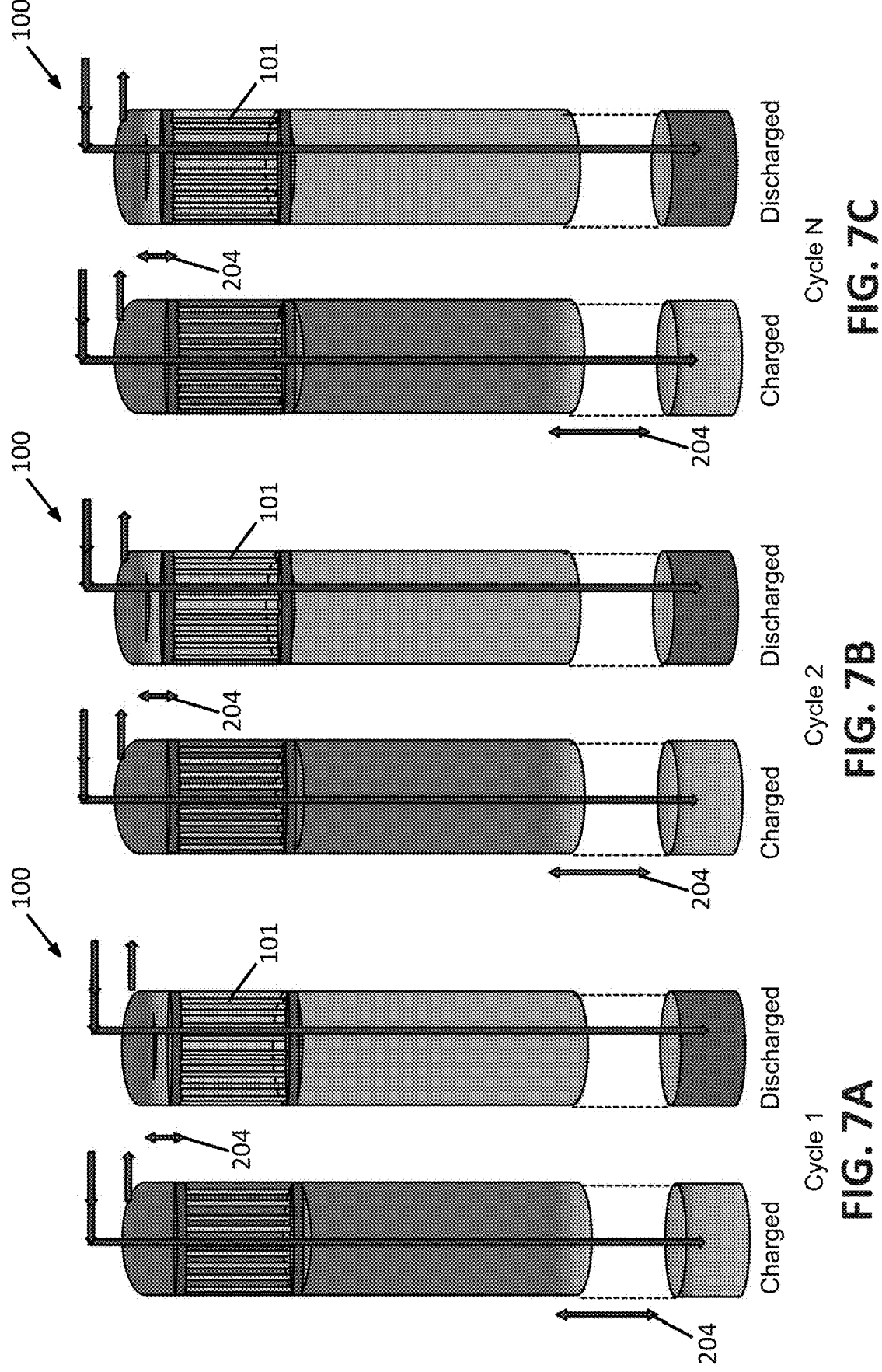
FIGS. 7A-7C are graphical representations of temperature profiles across successive charge/discharge cycles in a system with a passive thermocline management mechanism, showing preserved stratification.

Referring now to FIGS. 7A through 7C, exemplary graphical representations are illustrated to demonstrate the preservation of thermocline zone 204 integrity over multiple charge and discharge cycles in thermal energy storage system 100 incorporating a passive thermocline management mechanism 101. FIG. 7A depicts the normalized temperature profiles corresponding to a first charge and discharge cycle, wherein a narrow and well-defined thermocline zone 204 is maintained. FIG. 7B illustrates the temperature profiles following a second full charge and discharge cycle, and FIG. 7C corresponds to an nth cycle. As shown, the thermocline zone 204 retains a consistent thickness and position across all cycles, indicating that passive thermal stratification management—such as via the use of encapsulated phase change material modules—effectively mitigates thermocline degradation and maintains high thermal storage efficiency throughout repeated operation.

Figure 8:
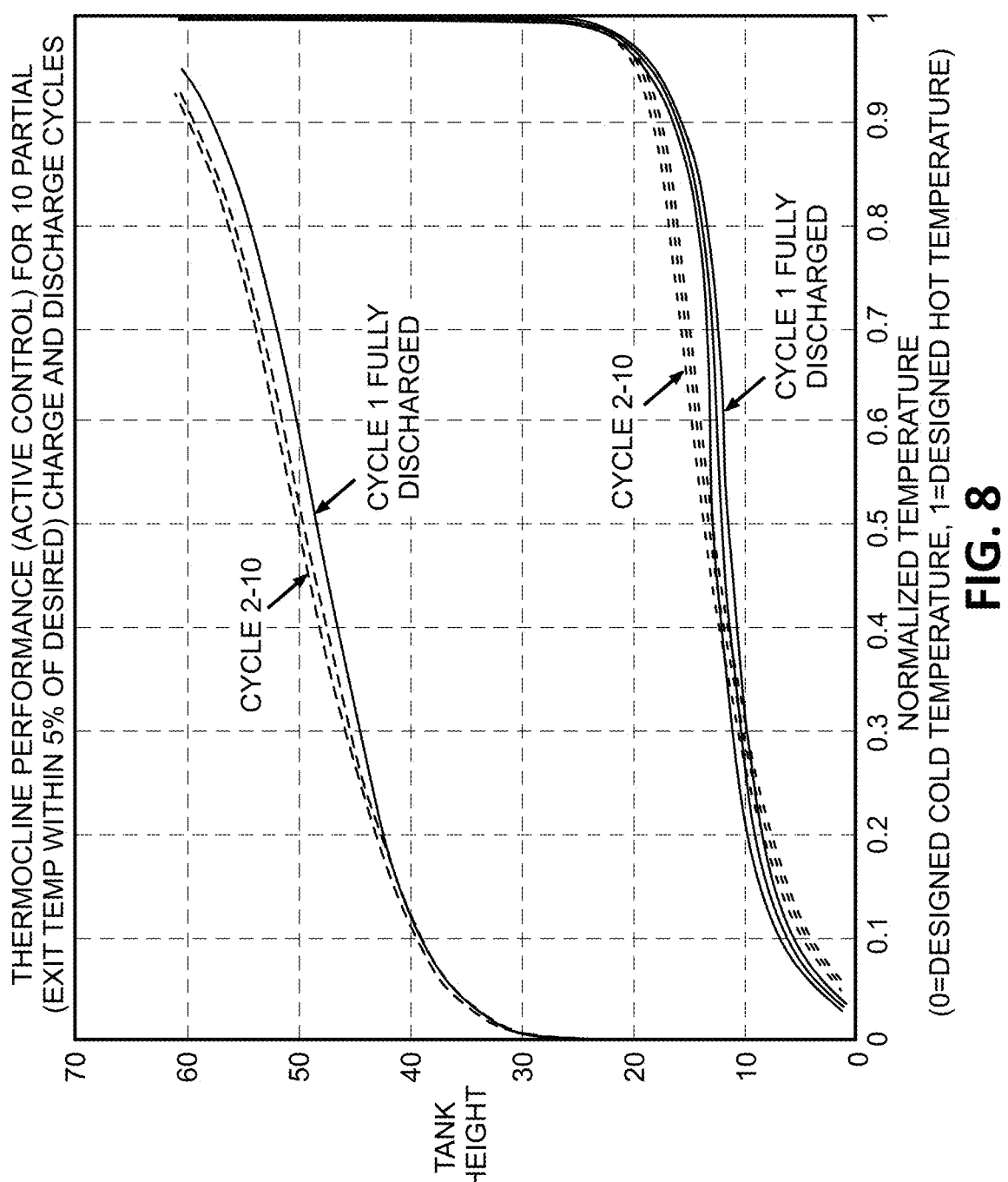
FIG. 8 is a graphical representation of temperature profiles across ten charge/discharge cycles in a system utilizing thermocline-preserving strategies, demonstrating consistent utilization factor.

Referring now to FIG. 8, an exemplary graphical representation of a temperature profile within thermal energy storage system 100 incorporating a passive thermocline management mechanism 101 is illustrated, in accordance with an embodiment of the invention. FIG. 8 depicts the normalized temperature profile versus the vertical height of a containment structure—such as repurposed wellbore 106—over the course of ten sequential charge and discharge cycles. The system configuration illustrated includes one or more thermocline-preserving strategies such as the use of encapsulated phase change material (PCM) modules.

As shown, the uppermost set of curves in FIG. 8 corresponds to the thermal condition of the reservoir during a fully charged state, in which thermal energy storage fluid 200 occupies the upper region of the wellbore and is maintained at an elevated temperature. The lowermost set of curves reflects the fully discharged state, wherein the fluid column is predominantly comprised of lower temperature thermal fluid 203. The area enclosed between these upper and lower curves is indicative of the usable thermal energy storage capacity of the thermal energy storage system 100 and provides a measure of the utilization factor across operating cycles.

In contrast to the progressive degradation observed in unmanaged systems such as that illustrated in FIG. 3, the temperature profiles depicted in FIG. 8 demonstrate that the thermal stratification is preserved across all ten cycles. The thermocline zone 204 remains sharply defined with minimal broadening, indicating that interlayer mixing, turbulence, and conductive losses have been effectively mitigated. The consistency in stratification results in a stable utilization factor, which remains substantially equivalent to the design specification over multiple charge-discharge cycles.

This stabilization of the thermocline zone 204 may be attributed to the inclusion of one or more passive or active thermocline control strategies as described herein. These include, for example, the use of internal fluid distribution mechanisms incorporated into valves to introduce or extract fluid at discrete vertical positions and controlled flow velocities, operation of pump 124 in accordance with predefined flow profiles, and intelligent control logic executed by controller based on real-time feedback from temperature sensors. In some embodiments, further enhancement of thermal performance may be achieved through coordinated multi-tank operation or by employing full-volume fluid exchange techniques to reset thermal conditions between cycles.

In some thermal energy storage systems, one approach to mitigating or reversing degradation of the thermocline zone 204 involves periodically reestablishing thermal stratification through complete displacement of the thermocline zone in the thermal energy storage reservoir. By fully displacing the thermocline region within the well, a new thermocline zone 204 may be reestablished under laminar or low-turbulence conditions, thereby restoring a sharper thermal gradient and improving the utilization factor of the system.

In accordance with another embodiment of the invention, thermocline stability and overall energy storage efficiency may be enhanced through the use of multiple thermal energy storage systems 100 operated in a coordinated, series-connected arrangement. In such configurations, a plurality of repurposed wellbores 106 are fluidically connected, and thermal energy storage fluid is transferred between systems in a controlled manner during charge and discharge operations. This approach enables more precise control over the thermocline zone across the overall storage system and allows for redistribution of thermal gradients to mitigate thermocline broadening that may occur within any single tank.

An example of such an approach is disclosed in U.S. Pat. No. 11,473,852, assigned to Terrafore, Inc., the contents of which are incorporated herein by reference in their entirety. In one embodiment, a first tank or containment structure 112 containing partially stratified fluid is connected to at least one adjacent tank or containment structure 112 configured to contain fluid at a lower average temperature. As the thermocline in the first containment structure descends during a charge cycle and approaches the bottom of the tank—thereby limiting the capacity of the fluid to absorb additional thermal energy—fluid from the adjacent, cooler tank may be selectively mixed with the warmer fluid to lower its inlet temperature prior to entering the heat source heat exchanger. This mixing increases the thermal differential across the heat exchanger, thereby maximizing the amount of heat transferred from the heat source to the fluid.

For example, when the temperature of fluid drawn from the bottom of a first tank approaches the average system temperature, and the outlet temperature or flow rate of the heat source heat exchanger approaches operational limits, a controller may actuate a set of valves to introduce cooler fluid from a second tank into the incoming flow stream. This results in a blended inlet stream to the heat source heat exchanger with a lower initial temperature, which improves heat exchanger utilization without exceeding temperature thresholds. This mixing strategy may begin gradually as the thermocline nears the bottom of the upstream tank and can be implemented in stages across a series of tanks to manage thermocline progression.

In discharge mode, a similar multi-tank arrangement can be employed to sequentially extract thermal energy as the thermocline ascends through each tank. For example, heated fluid may be extracted from the top of a downstream tank and directed to a discharge heat exchanger. As cold fluid exits the discharge heat exchanger, it may be returned to the bottom of the downstream tank, thereby displacing warmer fluid upward. As the thermocline reaches the top of the downstream tank, the controller may close associated valves and redirect cold fluid to the bottom of the next upstream tank, while extracting hot fluid from the top of that tank. This controlled sequencing continues until the thermocline passes through the uppermost tank, at which point the thermal energy storage system may be considered fully discharged.

However, such an approach may be impractical or economically infeasible in the context of repurposed oil or gas wells utilized as subsurface thermal reservoirs. Unlike purpose-built thermal storage tanks, which may be co-located within a centralized facility and readily interconnected via engineered piping systems, repurposed wells are frequently dispersed across wide geographic regions, such as oilfields or depleted basins. In such distributed configurations, the spatial separation between wells introduces substantial logistical and operational challenges, particularly with respect to the coordinated transfer of thermal energy storage fluid between wells. Implementing such inter-well connectivity would necessitate the construction of extensive piping infrastructure, pressure management systems, and distributed pumping equipment, all of which impose significant capital investment, increased maintenance burdens, and system complexity.

In accordance with yet another embodiment, thermal energy storage system 100 may employ a dual-media configuration, wherein the storage medium comprises a combination of solid particles and a liquid heat transfer fluid. In such systems, thermal energy is stored both in the solid phase—via conduction into granular or ceramic media—and in the liquid phase by increasing the temperature of the surrounding fluid. During a charge cycle, heated thermal energy storage fluid is circulated through the tank, transferring energy to the solid matrix and interstitial liquid. During a discharge cycle, thermal energy is extracted from the fluid, which has absorbed heat from the solids, and directed to a thermal load or heat exchanger. An example of such a system is disclosed in U.S. Pat. No. 10,107,564, the contents of which are incorporated herein by reference in their entirety.

The solid phase may include particulate materials such as rock, quartzite, granite, or engineered ceramics, typically having an average particle size of approximately one inch. The liquid phase may comprise thermally stable fluids such as molten salts or commercially available heat transfer oils. Material selection may vary depending on operational requirements, including temperature range, thermal conductivity, chemical compatibility, and cost. The dual-media configuration offers benefits including enhanced volumetric energy density, reduced material cost, and simplified design for large-scale thermal energy storage applications.

Figure 9B:
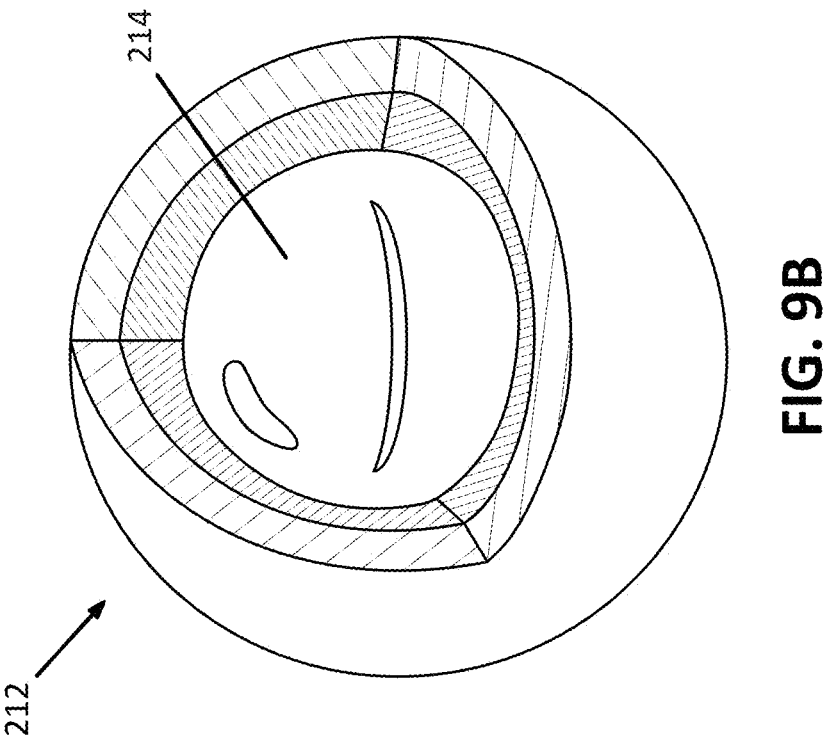
FIGS. 9A and 9B are cross-sectional views of a PCM module, showing the encapsulated core in solid and liquid states, respectively, during a thermal cycle.
Figure 9A:
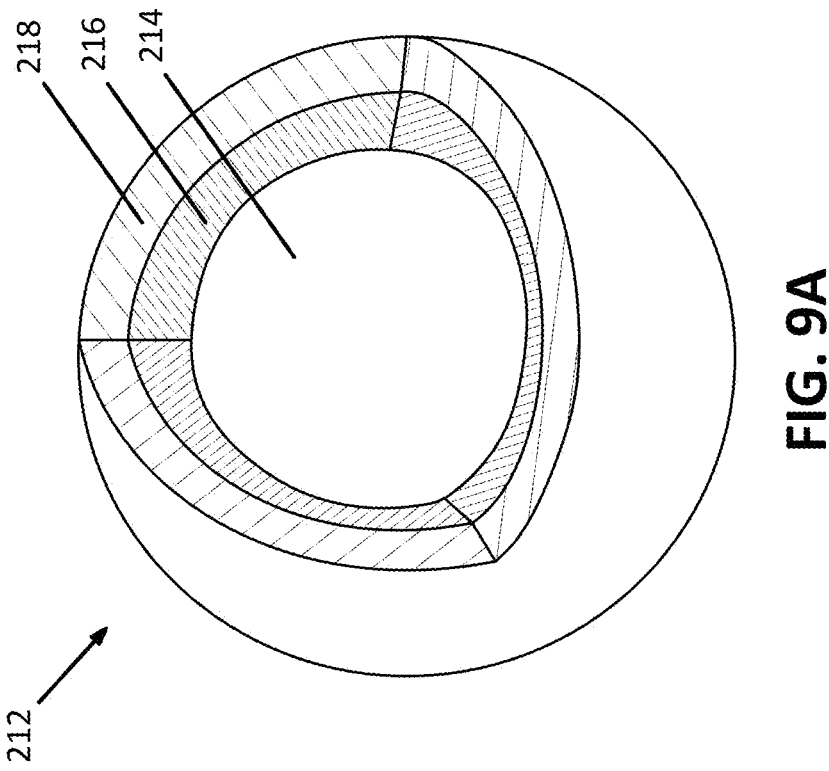

Referring now to FIGS. 9A and 9B, a PCM module 212 is illustrated, in accordance with an embodiment of the invention. PCM module 212 comprises a capsule including a core 214 containing a phase change material (PCM) encapsulated by an intermediate material layer 216 and a sealing outer material layer 218. As shown in FIG. 9A, core 214 is in a solid phase, while FIG. 9B illustrates core 214 in a liquid phase following a phase transition. The capsule further includes a void between the core 214 and encapsulating layer 216, configured to accommodate the volumetric expansion of the PCM during melting and contraction during solidification. This void prevents mechanical deformation or rupture of the capsule during thermal cycling.

In one embodiment, PCM module 212 is formed using a multilayer encapsulation technique, wherein core 214 is coated with a thermally decomposable material, followed by a thermally stable intermediate layer 216. Upon heating, the decomposable layer vaporizes, forming the internal void. A sealing outer layer 218 is then applied to enhance structural strength and thermal performance. In an alternate embodiment, the capsule is formed using a sintering process, wherein metal particles and a binder are applied around core 214. After sintering, a sealing layer 218 is added to fill micro-voids or surface defects. In either case, PCM module 212 is designed for repeated thermal cycling, maintaining phase change integrity while providing efficient heat transfer with surrounding thermal energy storage fluid 200.

Figure 10B:
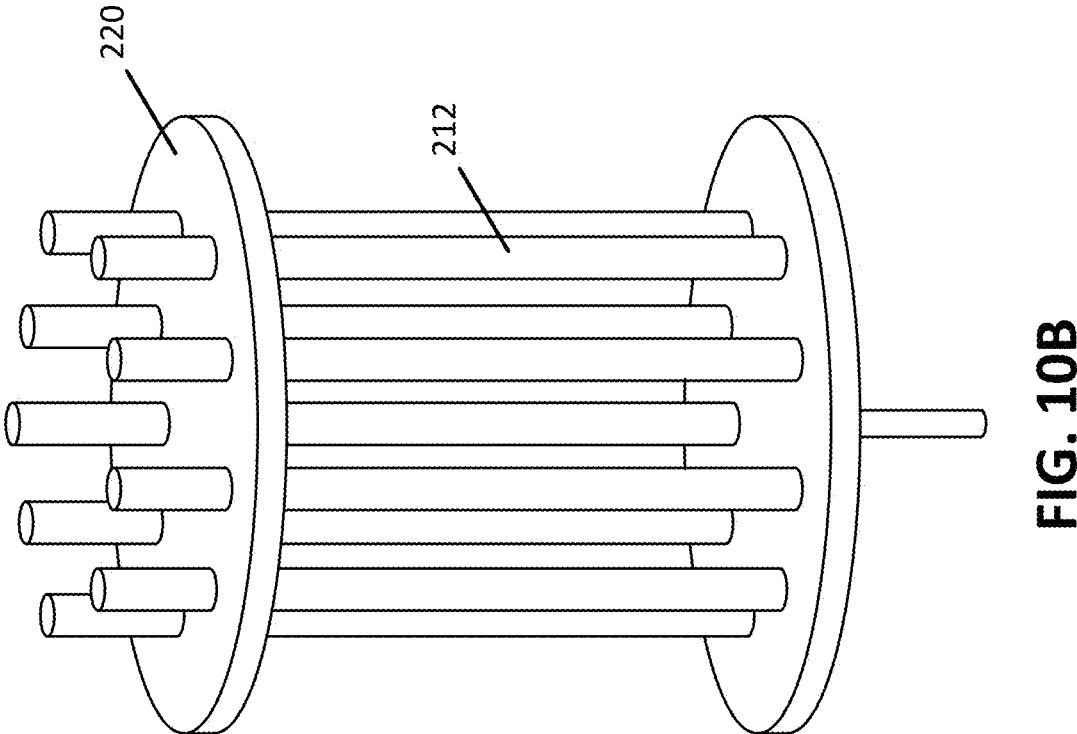
FIGS. 10A and 10B are illustrations of PCM modules comprising macro-encapsulated tubes retained within a support frame and submerged in thermal energy storage fluid.
Figure 10A:
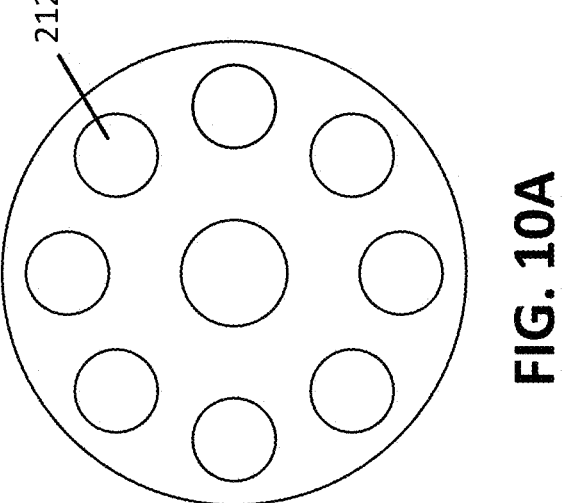

In accordance with various embodiments of the invention, a passive thermocline management mechanism may be implemented using one or more phase change material (PCM) modules. Referring now to FIGS. 10A and 10B, an embodiment of the PCM module is illustrated in which the PCM modules comprise a plurality of macro-encapsulated rods or tubes 212, each containing a PCM core 214 sealed within a high-thermal-conductivity enclosure, such as a metal or polymeric tube. As shown in FIG. 10A, the macro-encapsulated tubes 212 are retained within a supporting frame 220, arranged in an ordered configuration such as a vertical rack or staggered grid. This structural arrangement promotes uniform spacing, minimizes displacement due to buoyancy or flow-induced forces, and enhances heat transfer between the PCM and the surrounding thermal energy storage fluid 200. FIG. 10B further illustrates the PCM module immersed in thermal energy storage fluid 200, wherein each PCM core 214 undergoes a controlled phase transition in response to fluid temperature variations. The encapsulating shell promotes rapid thermal conduction, while the supporting frame 220 enables modular installation and serves to mitigate fluid mixing and maintain thermal stratification during cyclic operation.

In alternate embodiments, the passive thermocline management mechanism may instead utilize spherical or capsule-shaped micro-encapsulated PCM particles, which may be suspended or fixed within a defined volume of the containment structure. In yet another embodiment, the PCM may be embedded within the pore structure of a thermally conductive metal foam, forming a distributed thermal energy storage matrix that enhances both latent heat absorption and spatially uniform thermal conduction. These alternative configurations may be selected based on application-specific factors including spatial constraints, fluid compatibility, and desired heat transfer characteristics.

Figure 11:
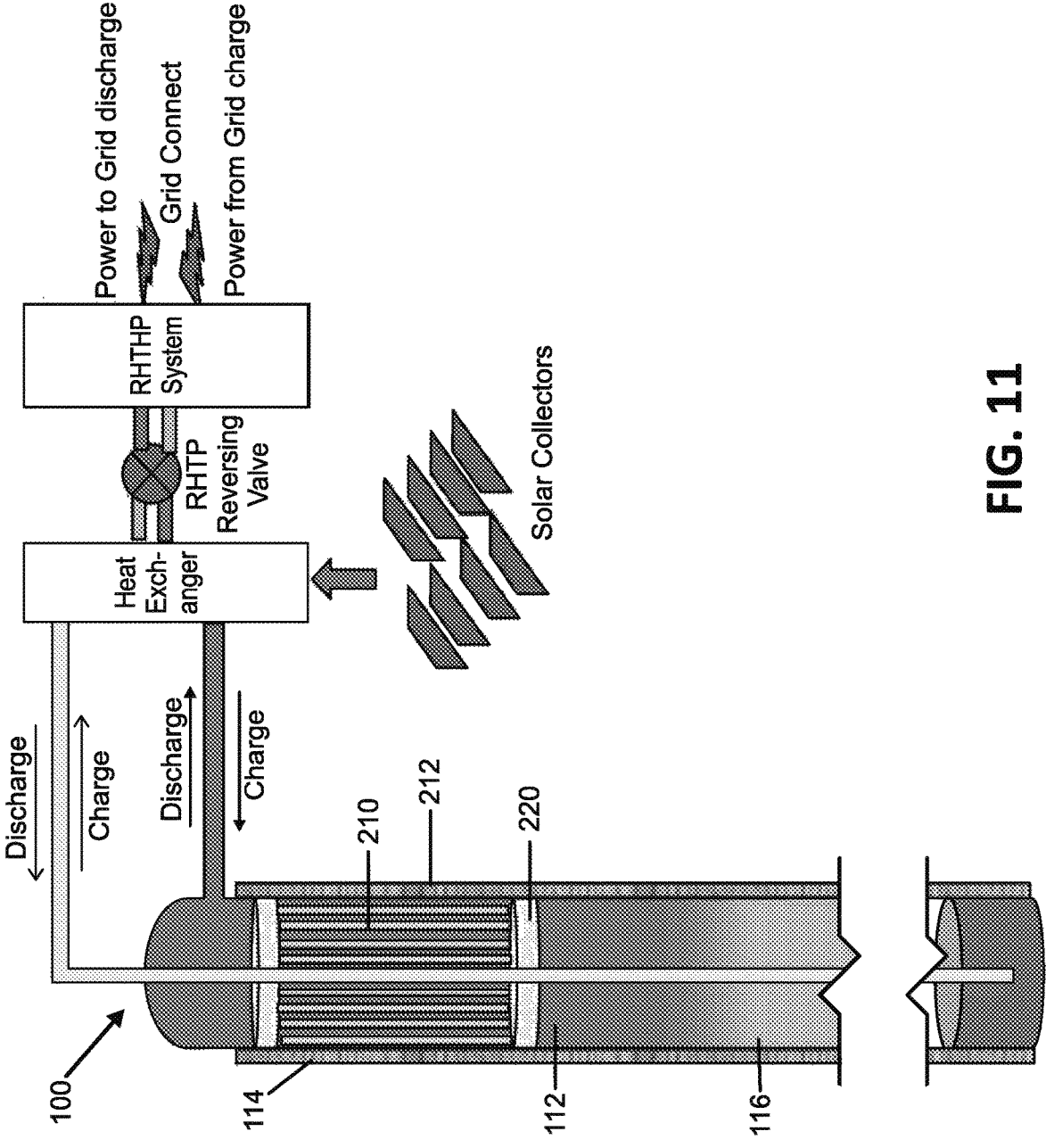
FIG. 11 is a schematic view of a thermal energy storage system containing a stratified fluid column and vertically arranged PCM modules for thermocline stabilization.

Referring now to FIG. 11, an embodiment of a thermal energy storage system 100 is illustrated. The thermal energy storage system 100 comprises a containment structure 112 configured to retain a thermal energy storage fluid 200. The containment structure 112 includes a top region 114 and a bottom region 116, each defined with respect to the vertical extent of the containment volume. Disposed within the thermal energy storage fluid 200 is a layer of phase change material, comprising a plurality of PCM modules 212, each encapsulating a quantity of phase change material. The PCM is configured to undergo a reversible phase transition between solid and liquid phases—or between two solid phases—at a constant or narrowly defined transition temperature, thereby enabling thermal energy to be stored in the form of both latent heat and sensible heat. During operation, the thermal energy storage system 100 is operable to store or discharge thermal energy by adjusting the temperature of the thermal energy storage fluid 200 according to system charging or discharging conditions.

In a charging mode, thermal energy is introduced into the thermal energy storage system 100 by extracting a portion of the thermal energy storage fluid 200 from the containment structure 112 and conveying the extracted fluid through a thermal conditioning unit. In one embodiment, the thermal conditioning unit comprises a reversible high-temperature heat pump (RHTHP) 130, which is configured to transfer thermal energy from an external low-grade source, such as solar thermal energy, waste heat recovery, or grid-supplied electricity, to the fluid stream. The fluid enters the RHTHP 130 through an inlet, is heated along an internal heat exchange path, and exits at an elevated temperature suitable for storage. The heated fluid is then returned to the top region 114 of the containment structure 112, where it is introduced at a selected vertical location to promote thermal stratification and preserve thermocline integrity.

Once reintroduced, the thermal energy storage fluid 200 transfers thermal energy to the layer of phase change material, causing each of the PCM modules 212 to absorb heat and undergo a phase change. As the PCM transitions from a solid to a liquid phase, latent heat is stored within the core of each PCM module 212. Additional thermal energy absorbed while the PCM remains in the solid or liquid phase is stored as sensible heat. The PCM modules 212 are fully submerged within the thermal energy storage fluid 200, with interstitial voids filled by the fluid, thereby ensuring effective thermal contact and uniform heat exchange. Each module 212 is structurally configured to contain the PCM during repeated cycling and maintain mechanical integrity and heat transfer performance.

In certain embodiments, the PCM modules 212 may be arranged vertically within the containment structure 112 to create a graded layer of phase change material. For example, modules disposed within the top region 114 may contain PCM with relatively higher melting points, while modules nearer the bottom region 116 may contain PCM with relatively lower melting points. This configuration establishes a stratified phase change layer, improving responsiveness and enabling thermal energy to be extracted efficiently across a broad temperature range during discharge cycles.

A plurality of temperature sensors may be disposed at various vertical positions along the height of containment structure 112 to monitor the internal temperature distribution of the thermal energy storage fluid 200 and detect the location and extent of the thermocline. These temperature signals are transmitted to a controller, which dynamically coordinates system operation.

The use of PCM modules 212 confers key technical advantages relative to systems relying solely on sensible heat storage media. A principal benefit of PCM integration is the material's capacity to absorb and release significant amounts of energy at or near a constant temperature, due to the latent heat of fusion or solid-solid transition. Unlike sensible storage, which relies on temperature change, PCM modules 212 enable thermal energy to be transferred isothermally, effectively flattening the thermocline and preserving stratification. The greater the vertical extent of the PCM layer, the more pronounced this flattening effect, yielding enhanced thermal stability and repeatability across multiple charge and discharge cycles.

The high energy density associated with PCM storage enables more compact containment structures, supporting deployment in space-constrained environments. Thermal energy storage systems employing PCM modules 212 can therefore be adapted for retrofits, modular energy units, or distributed energy storage installations. Moreover, because PCMs stabilize output temperature during thermal cycling, the system can maintain precise temperature control, making it well-suited for use in CSP plants, industrial thermal recovery, and HVAC systems requiring tight regulation.

The inclusion of PCM modules 212 also reduces thermal cycling stress on the containment structure 112 and associated components, extending system longevity and reducing operational fatigue. The phase change buffer mitigates rapid temperature fluctuations, improving reliability and reducing maintenance requirements under long-duration cyclic loads.

Thermal energy storage system 100, employing PCM modules 212, is especially advantageous for integration with intermittent energy sources, such as solar or wind power. The system functions as a thermal buffer, storing excess energy when supply exceeds demand and releasing thermal energy when needed. This enhances the flexibility of grid operations and supports more efficient renewable energy utilization.

Accordingly, the integration of PCM modules 212 within a stratified thermal energy storage architecture provides a scalable, repeatable, and high-efficiency energy storage solution. As clean energy systems continue to evolve, PCM-based storage offers compelling performance, adaptability, and long-duration capabilities essential for decarbonized energy infrastructure.

In accordance with one or more embodiments of the present invention, a thermal energy storage system—such as thermal energy storage system 100—may be configured to employ a plurality of thermocline management strategies, either individually or in combination, to preserve thermal stratification and maintain effective energy storage performance over prolonged operational durations. These strategies are particularly advantageous in implementations utilizing repurposed oil or gas wells that have been permanently sealed in accordance with regulatory standards and adapted for use as subsurface thermal energy reservoirs.

For example, in one embodiment, the thermal energy storage system is configured to permit complete drainage and refilling of one or more wells or tanks during controlled charge or discharge cycles. This full-volume exchange approach can be used to reestablish or sharpen the thermocline zone following degradation caused by repeated thermal cycling. Such functionality is especially effective in multi-reservoir systems, wherein individual wells or tanks may be cycled and conditioned in staggered or alternating fashion to enable continuous operation without system-wide downtime.

In another embodiment, the system may incorporate a plurality of thermal energy storage vessels—such as tanks or converted wells—operated in a series-connected arrangement. Thermal energy storage fluid may be routed sequentially between reservoirs during charge and discharge operations to shape and constrain the thermocline zone as it progresses through the system. For example, cooler fluid may be introduced at the base of a downstream tank as warmer fluid is drawn from an upstream tank, facilitating stratified heat transfer and minimizing undesirable mixing. This series configuration may also enable dynamic fluid blending or staging, wherein fluid from one tank may be mixed with fluid from another to better match the thermal capacity of downstream heat exchangers or conditioning units.

To further preserve thermocline integrity, the system may additionally include internal fluid distribution mechanisms configured to introduce or extract thermal energy storage fluid at various vertical positions along the height of each storage vessel. Such distribution mechanisms may include, without limitation, vertically spaced flow distributors, perforated manifolds, laminar flow inlets, or droplet-generating nozzles. These elements are configured to control the direction, velocity, and location of fluid flow, thereby minimizing turbulence, suppressing convective mixing, and supporting the formation and preservation of a well-defined thermocline zone across the vertical axis of the storage tank or wellbore.

In some embodiments, the thermal storage media within each vessel may be implemented using a dual-media configuration comprising a combination of solid particles and a liquid heat transfer fluid. The solid particles—such as gravel, ceramics, or sintered materials—serve as fixed heat absorbers, while the interstitial fluid facilitates convective heat exchange. Heat is thereby stored in both the liquid and the solid phase, resulting in higher thermal capacity and improved energy density within a given storage volume.

In accordance with certain embodiments, the thermal energy storage system 100 may further comprise a closed-loop heat exchanger disposed within the interior of the repurposed well, such as within the containment structure formed by the wellbore. The heat exchanger may be constructed using a combination of thermally conductive and thermally insulating materials, arranged in a manner that promotes directional heat transfer efficiency toward the thermal energy storage medium while mitigating thermal losses to the surrounding subsurface geology. A renewable heat source, such as a solar thermal collector array, may be thermally coupled to the heat exchanger through the intermediary of a RHTHP. The RHTHP may be configured to elevate the temperature of a working fluid, such as pressurized water, to temperatures of approximately 200° C. or higher. During system charging, the heated working fluid is circulated through the internal heat exchanger to deliver thermal energy to the storage media contained within the well.

During discharging operations, the working fluid is again circulated through the closed-loop heat exchanger to absorb thermal energy stored within the reservoir. The resulting heated working fluid is directed to the RHTHP operating in a reverse cycle mode, wherein thermal energy is extracted and converted into a useful form of mechanical or electrical energy, such as for dispatchable electricity generation. In one embodiment, the thermal reservoir may further include a plurality of macro-encapsulated tubes, each comprising a quantity of PCM sealed within a high-conductivity polymer shell or a metal tube. These encapsulated PCM structures are thermally submerged within the heat transfer medium and are operable to store thermal energy through latent heat absorption and release associated with solid-liquid phase transitions. The encapsulation enhances thermal conductivity and heat transfer efficiency, allowing for more rapid and uniform thermal exchange between the PCM and the working fluid. Moreover, the inclusion of PCM in such macro-encapsulated form is configured to reduce thermocline degradation by at least 30% over 50 charge/discharge cycles, as compared to a similarly configured system devoid of PCM.

In certain embodiments, all of the aforementioned thermocline management approaches—including full-volume fluid exchange during recharge or discharge cycles, multi-tank or multi-well series arrangements, internal fluid distribution mechanisms for stratified inflow/outflow control, dual-media storage using both solid and fluid media, and PCM-based thermal regulation using macro-encapsulated tubes—may be implemented in combination within a single deployment of thermal energy storage system 100. In alternative embodiments, a subset of these thermocline-preserving strategies may be selected and applied based on a range of system-level design considerations, such as the geographic distribution and accessibility of repurposed wells, volumetric energy throughput targets, allowable thermal gradients, local geology, or regulatory constraints. This flexible, modular architecture allows thermal energy storage system 100 to be configured for high-performance operation across a diverse array of site conditions and application domains, providing improved thermal stratification, extended storage durations, and dispatchable thermal-to-electric conversion capability.

Figure 12:
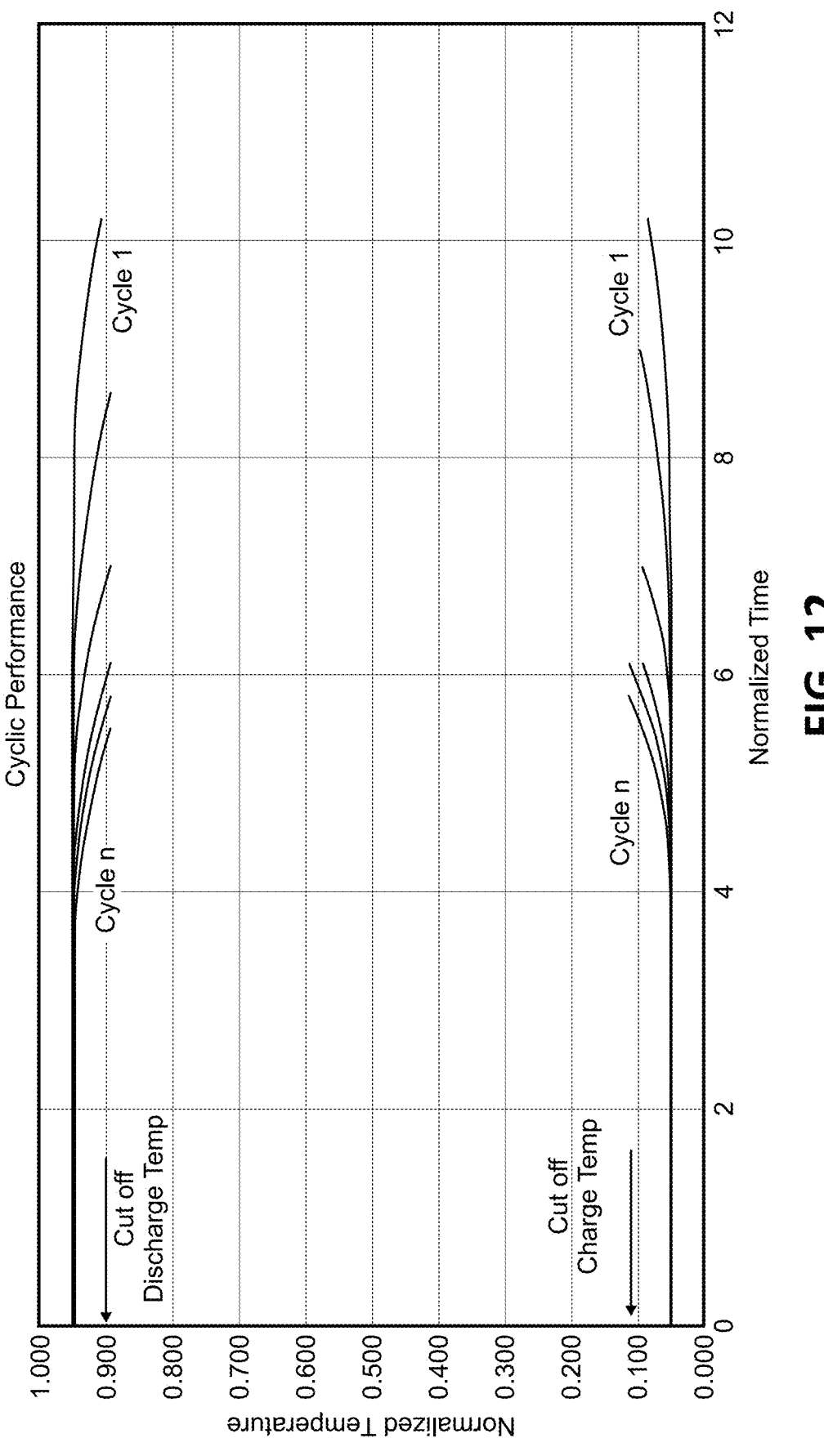
FIG. 12 is a graph of end-of-cycle fluid temperature as a function of time over multiple cycles in a system without thermocline-preserving features, showing decreased energy storage performance.

Referring now to FIG. 12, an exemplary graphical representation of thermal reservoir behavior without thermocline-preserving strategies—such as a PCM module—is illustrated. The graph depicts the end-of-cycle temperature of thermal energy storage fluid 200 as a function of time over multiple charge and discharge cycles, assuming a constant heat input or extraction rate per cycle. The horizontal axis represents time elapsed during each charging or discharging event, while the vertical axis denotes the terminal temperature of the fluid at the end of each cycle.

As illustrated in FIG. 12, in the absence of passive or active thermocline stabilization, the time to reach target terminal temperatures decreases with each successive cycle. This reduction in duration reflects the progressive degradation of the thermocline zone 204, which leads to thermal mixing and diminished stratification. Because the time to reach a given cut-off temperature is directly proportional to the amount of thermal energy stored or extracted at a constant heat rate, this observed shortening of duration is indicative of declining system energy storage capacity and performance.

Figure 13:
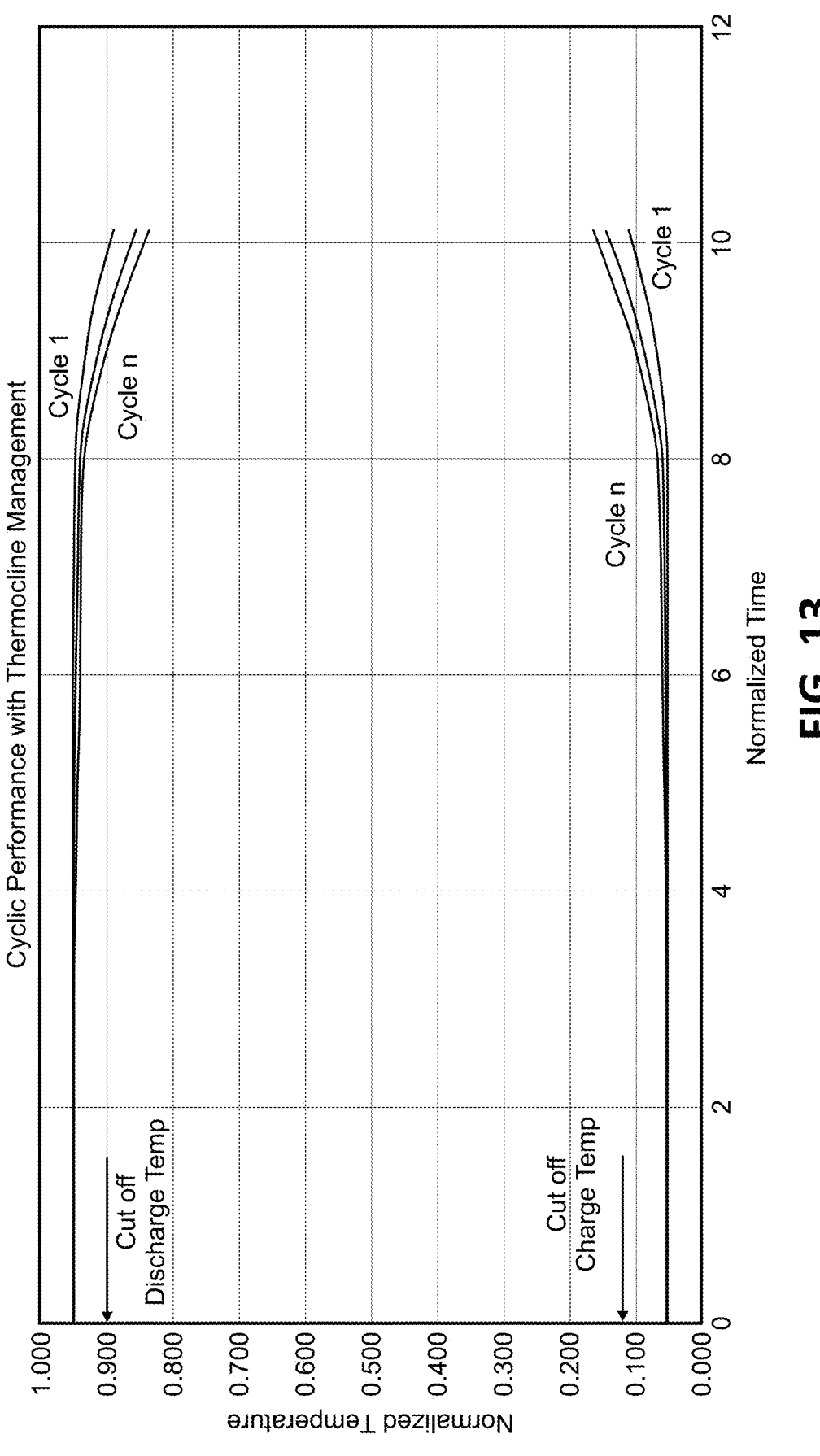
FIG. 13 is a graph of end-of-cycle fluid temperature as a function of time over multiple cycles in a system incorporating thermocline-preserving features, demonstrating thermal stability.

Referring now to FIG. 13, an alternative graphical representation is shown corresponding to embodiments of the invention that incorporate one or more thermocline-preserving features. These features may include, but are not limited to, the use of internal flow distributors or droplet-forming injection ports, coordinated vertical fluid routing, or the inclusion of passive thermocline management mechanisms—such as encapsulated PCM modules 212—within the containment structure 112. In some configurations, these approaches may be deployed independently or in combination to suppress thermal blending and preserve the sharpness of the thermocline.

As shown in FIG. 13, with such thermocline-preserving strategies in place, the temperature-versus-time profile remains substantially stable across all charge and discharge cycles. The time required to reach designated terminal temperatures is consistent with the performance observed in the first cycle, indicating minimal degradation of thermal stratification. This thermal stability enhances predictability, preserves system energy density, and supports high-efficiency performance suitable for long-duration energy storage applications.

Referring now to FIGS. 14A through 14E, various embodiments of a distributed energy resource 110 are illustrated, each depicting alternate configurations for the integration of one or more passive thermocline management mechanisms 101 and thermal energy storage systems 100. These configurations are illustrative of different flow arrangements and control strategies for managing thermal stratification and optimizing thermal energy storage and recovery.

In the embodiment shown in FIG. 14A, a single passive thermocline management mechanism 101 is positioned upstream of a thermal energy storage system 100A. During a charging operation, thermal energy storage fluid 200 is conditioned (e.g., heated) and directed through the passive thermocline management mechanism 101 prior to entry into thermal energy storage system 100A. The passive thermocline management mechanism 101 serves to regulate inflow velocity and temperature gradients, thereby preserving or enhancing the stratification of fluid layers within the storage volume of system 100A.

FIG. 14B depicts an alternative embodiment wherein the passive thermocline management mechanism 101 is positioned between a first thermal energy storage system 100A and a second thermal energy storage system 100B. In this configuration, fluid 200 is drawn from thermal energy storage system 100A, passed through the passive thermocline management mechanism 101, and subsequently introduced into thermal energy storage system 100B during a charge operation. This intermediate placement enables the thermocline management mechanism 101 to condition the thermal profile of fluid 200 before entry into system 100B, thereby enhancing stratification across multiple storage systems.

As shown in FIG. 14C, an embodiment of the distributed energy resource 110 includes a first passive thermocline management mechanism 101A positioned upstream of thermal energy storage system 100A, and a second passive thermocline management mechanism 101B positioned downstream of the thermal energy storage system 100A. In this arrangement, thermal energy storage fluid 200 flows sequentially from mechanism 101A to system 100A, and then from system 100A through mechanism 101B. This configuration provides stratification control at both inlet and outlet flow paths, reducing mixing disturbances and supporting bidirectional thermal cycling operations.

In FIG. 14D, a second thermal energy storage system 100B is added downstream of the second passive thermocline management mechanism 101B. During charging, fluid 200 flows from first passive thermocline management mechanism 101A into thermal energy storage system 100A, through second passive thermocline management mechanism 101B, and finally into second thermal energy storage system 100B. This serial arrangement supports extended thermal storage capacity and staged stratification control across multiple units.

FIG. 14E further expands upon the embodiment of FIG. 14D by including a third passive thermocline management mechanism 101C positioned downstream of the second thermal energy storage system 100B. In this configuration, thermal energy storage fluid 200 is conditioned at multiple stages, enhancing thermal gradient management and minimizing thermocline degradation throughout the network. Such multistage configurations allow for fine-grained control over thermal stratification and facilitate modular system design for large-scale or distributed deployments.

In some embodiments, one or more of the thermal energy storage systems 100A and 100B may be implemented as packed bed thermal energy storage systems, wherein a stratified thermal energy storage fluid is circulated through a bed of thermally stable solid media such as rocks or ceramic particles. The packed bed architecture supports both sensible heat storage and thermal stratification through fluid-solid heat exchange. In alternate embodiments, the thermal energy storage systems 100A and 100B may comprise only a stratified thermal energy storage fluid volume, i.e., without any solid particulate media, relying on fluid thermal gradients and passive management techniques to preserve the thermocline during charge and discharge operations.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A multi-reservoir thermal energy storage system, comprising:

a first containment structure configured to hold a thermal energy storage fluid and a dual-media thermal storage medium comprising a packed bed of solid particulate material selected from rock, quartzite, granite, or ceramic particles immersed in the thermal energy storage fluid, wherein the thermal energy storage fluid comprises molten salt;

a second containment structure fluidly coupled in series to the first containment structure and configured to hold the thermal energy storage fluid, wherein the second containment structure is substantially free of phase change material;

at least one thermocline management mechanism comprising a layer of phase change material (PCM) encapsulated within a plurality of microcapsules or macro-encapsulated tubes, the PCM being positioned at least proximate to a top region and/or a bottom region of the first containment structure and configured to function as a thermocline damper that flattens the thermocline zone as the thermocline passes through the layer of PCM during charge and discharge cycles;

a charge/discharge assembly comprising at least one pump and heat exchanger configured to transfer thermal energy into and out of the first and second containment structures; and wherein thermal energy is stored as sensible heat in the thermal energy storage fluid and the dual-media thermal storage medium;

wherein the PCM is configured to passively stabilize a thermocline formed in the thermal energy storage fluid held by either the first containment structure or the second containment structure by absorbing and releasing latent heat at a predefined phase transition temperature, wherein the PCM positioned exclusively in the first containment structure provides system-wide thermocline stabilization across both the first and second containment structures;

by intercepting and damping thermocline broadening as the thermocline zone moves vertically through the first containment structure during charging and discharging operations.

2. The multi-reservoir thermal energy storage system of claim 1, wherein the PCM positioned proximate to the top region of the first containment structure has a melting point within 10-15° C. below a maximum operating temperature of the thermal energy storage fluid.

3. The multi-reservoir thermal energy storage system of claim 1, wherein the PCM positioned proximate to the bottom region of the first containment structure has a melting point within 10-15° C. above a minimum operating temperature of the thermal energy storage fluid.

4. The multi-reservoir thermal energy storage system of claim 1, wherein the first and second containment structures each comprise a wellbore, and wherein the multi-reservoir thermal energy storage system is configured to repurpose an abandoned or idle hydrocarbon well for thermal energy storage.

5. The multi-reservoir thermal energy storage system of claim 1, further comprising a reversible heat pump operatively coupled to the charge/discharge assembly, the reversible heat pump being configured to store thermal energy by compressing a working fluid in a charging mode to elevate a temperature of the working fluid to at least about 200° C., and to extract thermal energy by expanding the working fluid in a discharging mode.

6. The multi-reservoir thermal energy storage system of claim 5, wherein the reversible heat pump is further configured to enable dispatchable electricity generation by transferring thermal energy to a power generation cycle, including at least one of a steam turbine, a thermodynamic engine, or a thermoelectric generation system.

7. The multi-reservoir thermal energy storage system of claim 1, wherein the PCM is encapsulated within polymer shells or metal tubes to enhance thermal conductivity and heat transfer efficiency.

8. The multi-reservoir thermal energy storage system of claim 1, wherein the PCM is configured such that after 50 charge/discharge cycles (i) a vertical thickness of a thermocline zone increases by no more than about 30%, and (ii) a utilization factor remains at least about 70%.

9. The multi-reservoir thermal energy storage system of claim 1, wherein the charge/discharge assembly is configured for operation using solar thermal energy, waste heat recovery, or grid-supplied electricity.

10. The multi-reservoir thermal energy storage system of claim 1, wherein the plurality of microcapsules comprise polymer shells configured to enhance thermal energy transfer between the PCM and the thermal energy storage fluid.

11. The multi-reservoir thermal energy storage system of claim 1, wherein the macro-encapsulated tubes comprise metal tubes.

12. The multi-reservoir thermal energy storage system of claim 1, further comprising a supporting frame structure positioned within the first containment structure, wherein the layer of phase change material is supported by the supporting frame structure.

13. The multi-reservoir thermal energy storage system of claim 12, wherein the supporting frame structure is configured to maintain the layer of phase change material at a predetermined vertical position within the first containment structure during charging and discharging operations.

14. A method for passively stabilizing a thermocline within a multi-reservoir thermal energy storage system, the method comprising:

fluidly coupling a first containment structure to a second containment structure in series;

providing a thermal energy storage fluid comprising molten salt within the first and second containment structures, wherein the second containment structure is substantially free of phase change material;

providing a dual-media thermal storage medium within the first containment structure, the dual-media thermal storage medium comprising a packed bed of solid particulate material selected from rock, quartzite, granite, or ceramic particles immersed in the thermal energy storage fluid;

positioning a phase change material (PCM) encapsulated within microcapsules or macro-encapsulated tubes at one or more predetermined vertical locations within the first containment structure to function as a thermocline damper;

transferring thermal energy into and out of the thermal energy storage fluid during cyclic charging and discharging operations, wherein thermal energy is stored as sensible heat in the thermal energy storage fluid and the dual-media thermal storage medium; and enabling the PCM to absorb and release thermal energy at a predefined phase transition temperature by intercepting and damping thermocline broadening as a thermocline zone moves vertically through the first containment structure during the charging and discharging operations, thereby reducing degradation of the thermocline, wherein the PCM positioned exclusively in the first containment structure provides system-wide thermocline stabilization across both the first and second containment structures.

15. The method of claim 14, wherein the PCM is positioned within both a top region and a bottom region of the first containment structure so as to narrow a thermocline zone formed within the thermal energy storage fluid.

16. The method of claim 14, wherein the first and second containment structures each comprise an idle or abandoned hydrocarbon well that has been repurposed to function as a thermal reservoir for thermal energy storage.

17. The method of claim 14, further comprising integrating a reversible heat pump operatively coupled to the multi-reservoir thermal energy storage system and configured to facilitate energy conversion extracting thermal energy from the thermal energy storage fluid or elevating a temperature of the thermal energy storage fluid to at least about 200°.

18. The method of claim 14, wherein the multi-reservoir thermal energy storage system is configured for long-duration energy storage (LDES) applications having discharge durations of approximately ten hours or more.

19. The method of claim 14, wherein the microcapsules or macro-encapsulated tubes comprise polymer shells or metal tubes configured to enhance thermal energy transfer between the PCM and the thermal energy storage fluid.

20. The method of claim 14, further comprising supporting the PCM with a frame structure positioned at the one or more predetermined vertical locations within the first containment structure.

\* \* \* \* \*